INVENTOR.
WILLIAM A. LYON
By Bernard Kriegel
ATTORNEY.

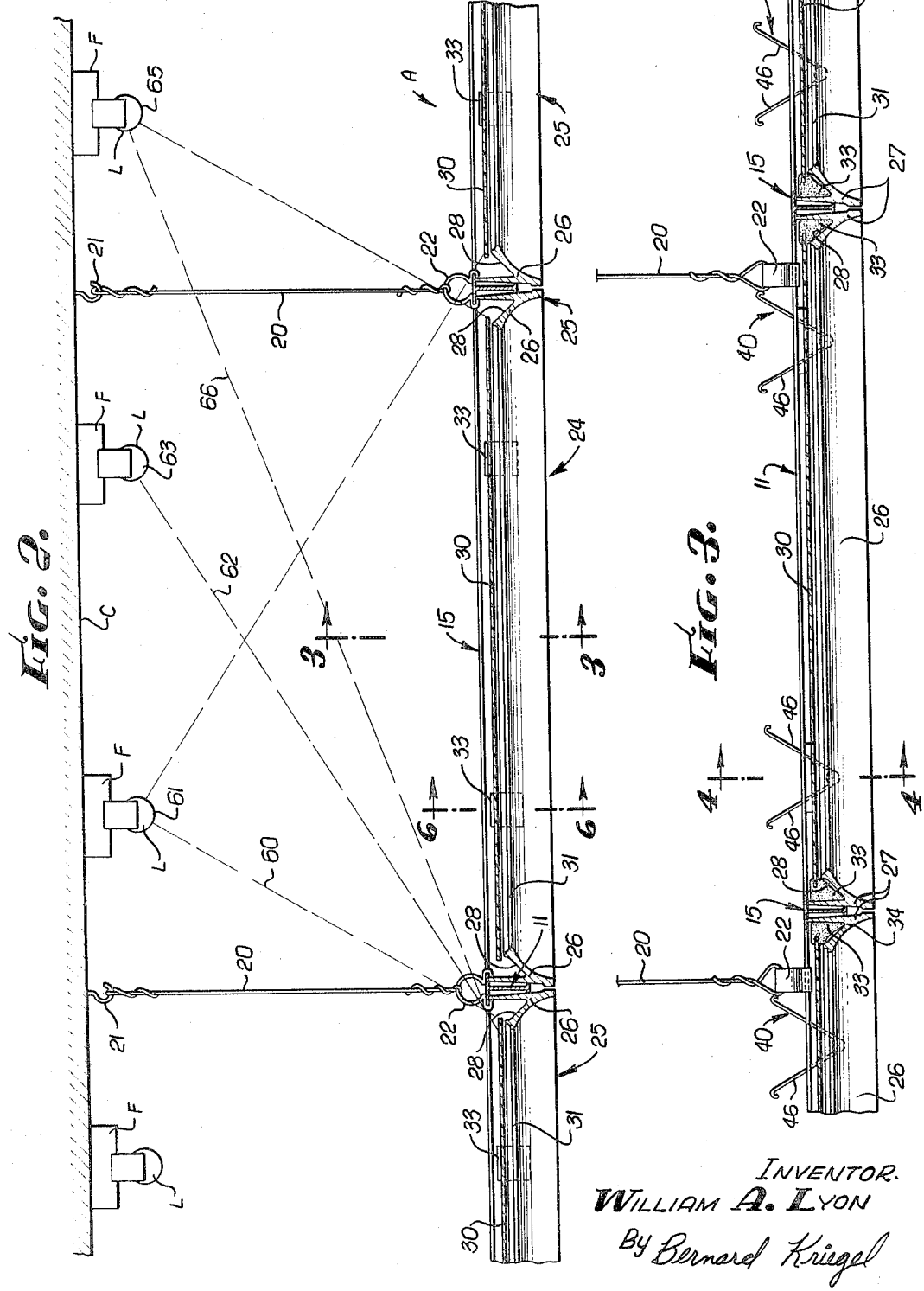

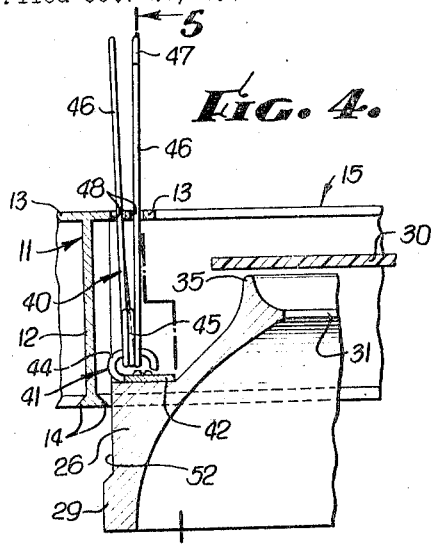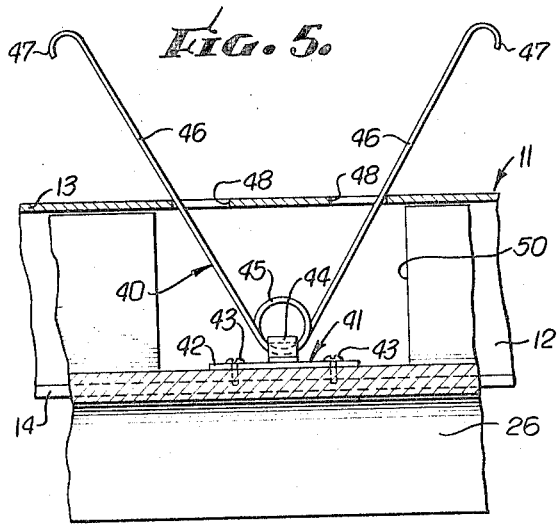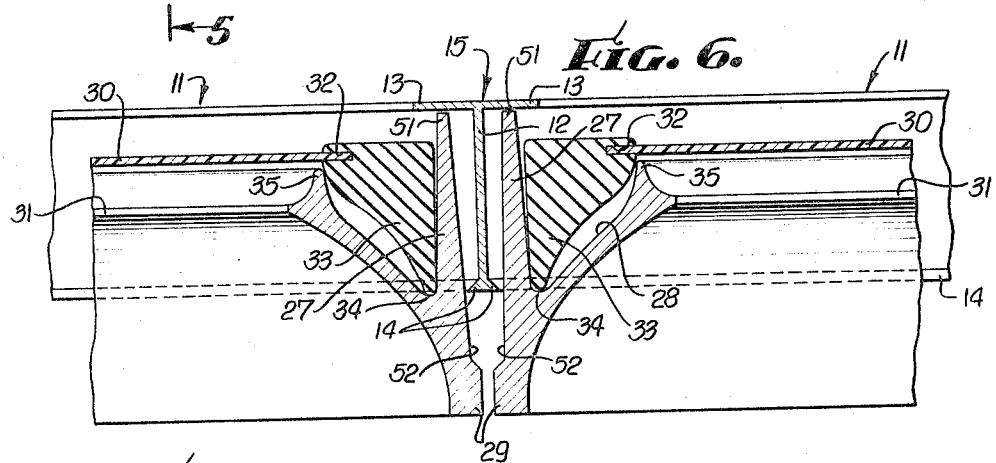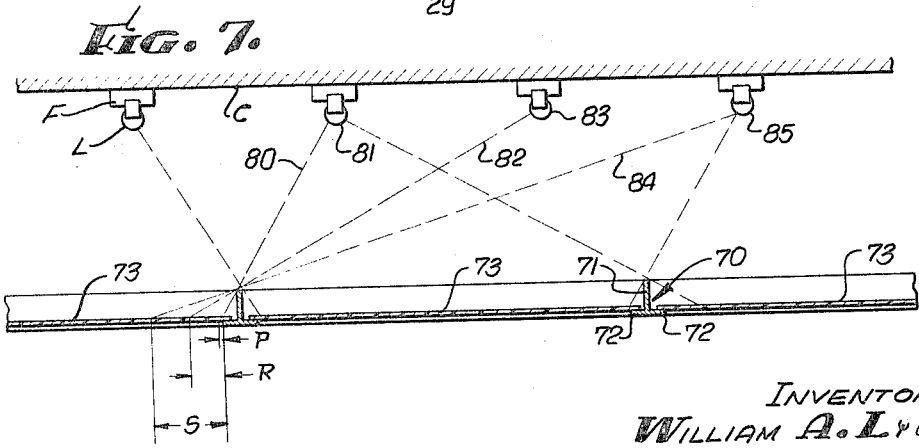

United States Patent Office 3,303,338
Patented Feb. 7, 1967

3,303,338
LIGHT DIFFUSER SYSTEM
William A. Lyon, Venice, Calif., assignor to Integrated Ceilings Inc., Los Angeles, Calif., a corporation of California
Filed Oct. 20, 1964, Ser. No. 405,218
7 Claims. (Cl. 240—9)

The present invention relates to lighting systems, and more particularly to apparatus for diffusing light emanating from lighting fixtures, such as those supported from ceilings.

Diffusers have been used below fluorescent and similar lighting fixtures mounted on a ceiling to distribute the illumination derived from the light source. The diffusers have been carried by a supporting structure suspended from the ceiling, but such supporting structures have resulted in the lamps casting shadows of portions of the structures on the diffusers, disturbing the uniformity of the illumination on the diffuser elements. Many types of supporting structures are visible, and thereby result in impairment in the appearance of the diffuser system. They also permit leakage of light between them and the diffuser members, which is highly undesirable.

Accordingly, it is an object of the present invention to provide a light diffuser system in which no shadow of the supporting structure is cast on the diffuser members by the light source, thereby insuring uniform light distribution over the light transmitting areas of the diffuser assembly.

Another object of the invention is to provide a light diffuser system in which the supporting structures for the diffuser members are concealed from view, and in which light leaks are eliminated.

An additional object of the invention is to provide a light diffuser system in which the vertical webs or flanges of the supporting structure for the diffuser assemblies serve to align the frames of the diffuser assemblies with respect to one another.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 2 is a vertical section through the lighting system disclosed in FIG. 1, with all of the frame and the diffuser assemblies in assembled position on the supporting structure;

FIG. 3 is a vertical section taken along the line 3—3 on FIG. 2;

FIG. 4 is an enlarged section taken along the line 4—4 on FIG. 3;

FIG. 5 is a vertical section taken along the line 5—5 on FIG. 4;

FIG. 6 is an enlarged vertical section taken along the line 6—6 on FIG. 2;

FIG. 7 is a view through a prior light diffuser system.

Figure 1:
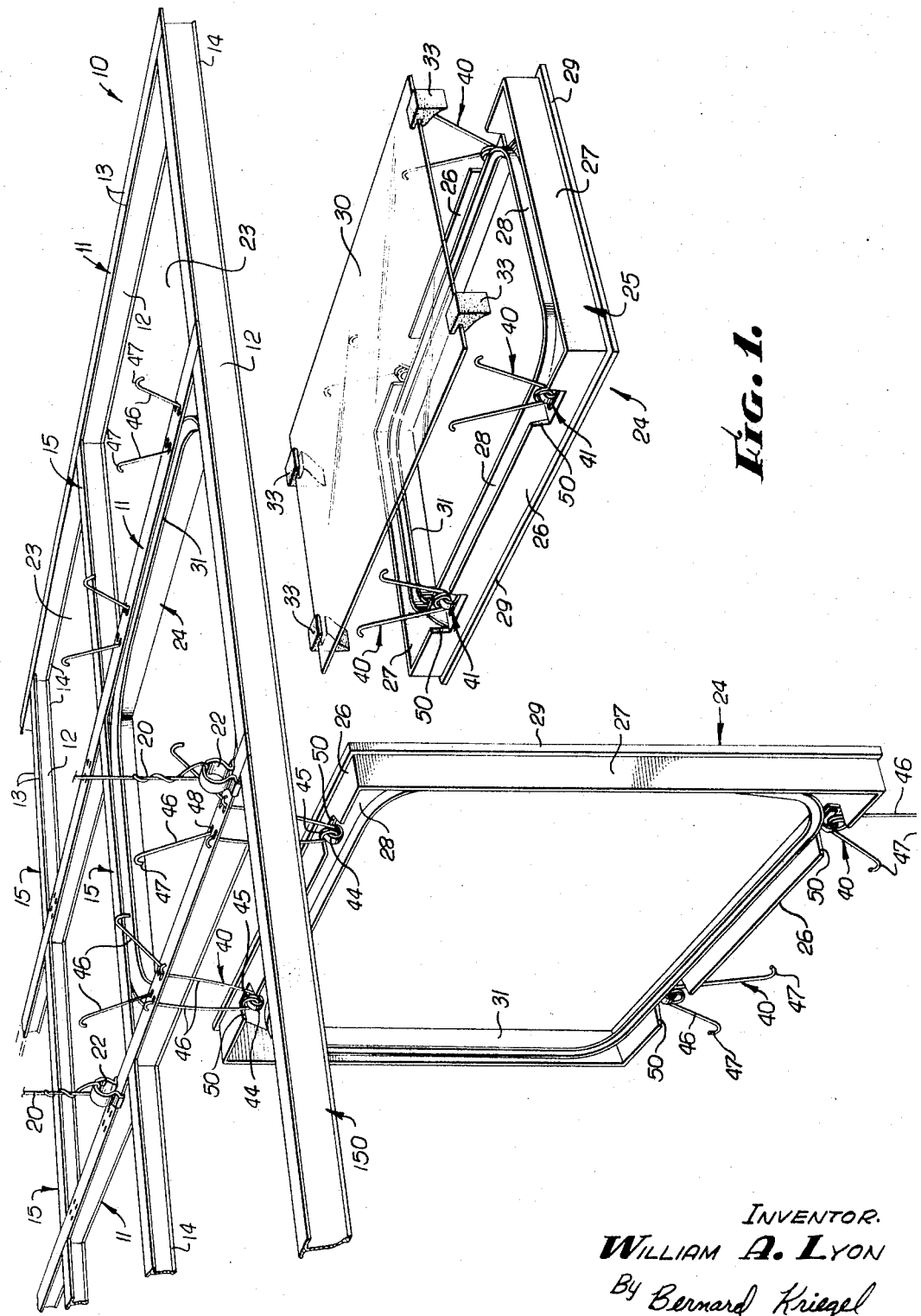
FIGURE 1 is an isometric view of a system embodying the invention including a supporting frame, a frame and diffuser assembly shown in open position with respect to the frame, a frame and diffuser assembly shown in closed position across the frame opening, and a frame diffuser assembly disclosed in exploded relation removed from the supporting structure.

The apparatus or system disclosed in the drawings can be used to cover substantially the entire area of a ceiling C, if desired, for the purpose of diffusing light emanating from a plurality of fixtures F mounted on the ceiling. As shown in FIG. 2, parallel rows of lighting fixtures F are carried from the ceiling, and a light diffuser apparatus A is suspended from the ceiling in spaced relation to and below the fixtures so as to fully cover the latter and diffuse the light emanating from the fluorescent tubes or lamps L mounted on the fixtures.

A supporting frame structure 10 is suspended from the ceiling C. This frame structure includes longitudinally arranged horizontal members 11, which are in parallel relation to each other and which may extend the entire length of the ceiling, if desired. Each horizontal member is of upright T cross-section, comprising a T-bar having a vertical flange or web 12 and opposed upper horizontal flanges 13 integral with the upper end of the latter. Relatively narrow lower horizontal flanges 14 are integral with and extend from the lower end of each vertical flange or web 12. Interconnecting the longitudinal supporting members or T-bars 11 are cross-supporting members, spreaders or separators 15 which are also in the form of upright T-bars. These cross-T-bars 15 include an end member 150 extending the entire width of the ceiling and also separating members 15 of a proper length to separate the longitudinal bars 11 and maintain them in parallel spaced relation to one another. The cross T-bars 15 are of the same cross-sectional dimension and of the same shape as the longitudinal T-bars 11 and include a vertical flange or web 12, upper opposed horizontal flanges 13 integral with its upper end, and narrow opposed lower horizontal flanges 14 integral with its lower end.

The longitudinal T-bars 11 and cross T-bars 15 are suitably secured together, in a known manner, and are suspended from the ceiling C the appropriate distance therebelow in parallel relation to the ceiling by hanging wires 20, the upper ends of which are attached to suitable upper connectors 21 secured to the ceiling, and the lower ends of which are suitably attached to hanger clips 22 affixed to the T-bars 11, as to the upper horizontal flanges 13 thereof.

The cross-members or spreaders 15 are secured to the longitudinal members 11 in appropriate spaced relation to form rectangular or square openings 23 therewith which are adapted to be covered by frame and diffuser assemblies 24. These assemblies are adapted to cover the rectangular openings, as well as to hide the frame 10 itself. The diffuser assemblies or devices 24 are so mounted on the frame as to be readily assembled thereto in a closed position across its openings 23 and closely adjacent to one another, to be swung to an open position, and even to be completely disconnected from the frame. As shown, each frame and diffuser assembly 24 includes a generally rectangular frame 25 having spaced parallel sides 26 suitably secured to spaced parallel end members 27. The sides 26 and end members 27 have upwardly opening channels or grooves 28 therein and also outwardly directed lower flanges 29. A diffuser 30, which may be made of glass or other suitable material, is adapted to close the upper end of the rectangular opening 31 of the frame, its end marginal portions fitting within grooves 32 in elastic retainer pads 33 received within the channels or grooves 28 of the end frame members 23, the pads resting upon the bases 34 of the grooves so as to support the diffuser element 30 slightly above the upper inner ends 35 of the side and end frame members 26, 27.

Each frame and diffuser assembly 24 is adapted to fit under and across a rectangular opening 23 of the supporting structure 10 and is releasably and hingedly secured to the longitudinal frame members 11 of the supporting structure by a plurality of spring-like hinge devices 40 secured in spaced relation to the side members 26 of the frame assembly. As shown, a spring retainer clip 41 has its plate or base portion 42 secured to the base of the channel of a side member 26 in any suitable manner, as, for example, by means of screws 43. This clip has an eye or loop 44 extending upwardly from its base 42, which receives a central coil portion 45 of a spring device 40 in order to pivotally and releasably assemble the spring device to the retainer 41. Extending from the coil portion are upwardly diverging spring arm members 46 terminating in outwardly directed fingers 47. The intermediate coil portion 45 normally tends to cause the arms 46 to assume a diverging condition, such as disclosed in FIG. 5, the arms passing through adjacent elongated holes or apertures 48 in a horizontal upper flange 13. The outwardly directed fingers 47 are adapted to pass through such adjacent holes or apertures, which are of sufficient length as to permit the fingers to pass therethrough when a frame and diffuser assembly 24 is to be completely disassembled from the supporting frame structure 10.

As shown in the drawings, there is a pair of spaced spring retainer clips 41 and torsion springs 40 mounted on each side member 26 of a frame 25, and the spring arms 46 and fingers 47 of each torsion spring are adapted to pass through a pair of apertures 48 in an upper horizontal flange 13 of a longitudinal T-bar member 11. When a frame and diffuser assembly 24 is to be mounted on the supporting structure, the spring arms 46 of each spring on one side of a frame are moved toward one another and the fingers 47 inserted through the flange apertures 48, the arms 46 then being released so that the fingers 47 overlie the horizontal flange 13 at the ends of the holes 48. The frame and diffuser assembly 24 can then be supported in a pendent condition, such as disclosed in FIG. 1 of the drawings. The arms 46 extending through outer notches 50 in the side 26. The frame and diffuser assembly 24 can then be swung upwardly so that the opposed set of torsion springs 40 can then have their arm portions 46 moved toward each other to permit the fingers 47 to pass through the companion apertures 48 in the horizontal flange of the next succeeding longitudinal T-bar 11 the arms 46 then being released for outward movement to place the fingers in overlapping relation to the flange 13 at the ends of the adjacent T-bar apertures 48. The entire frame and diffuser assembly 24 can then be moved upwardly until the upper end 51 of the side and end members 26, 27 of the frame 25 engage the upper horizontal flanges 13 of the longitudinal T-bars 11 and cross T-bars 15, the coil portions 45 of the torsion springs expanding and further diverging the arms 46, holding them outwardly to support each frame and diffuser assembly in its uppermost position, as disclosed in FIGS. 2 to 6, inclusive.

When all of the frame and diffuser assemblies 24 have been mounted on the supporting structure 10, the upper ends 51 of the sides 26 and end portions 27 of the assemblies are engaging the underside of the horizontal T-bar flanges 13. The outer surfaces 52 of the side and end members 26, 27 are contiguous the lower narrow oppositely directed horizontal flanges 14 of the longitudinal and cross T-bar members, and the lower outwardly directed flanges 29 of adjacent frames 25 are closely adjacent to each other in underlying relation to the web or vertical flange 12 of the T-bars and their lower horizontal flanges 14 to substantially completely conceal the latter. With the frame assemblies 24 so mounted on the supporting structure 10, the diffuser panels 30 are elevated substantially above the lower ends of the vertical webs 12, being disposed at the upper portion of the latter, and, in fact, are adjacent to the horizontal plane in which the upper horizontal flanges 13 lie, as shown clearly in FIGS. 2 to 6, inclusive.

The light diffuser system illustrated in FIGS. 1 to 6, inclusive, and described above, results in the supporting structure 10 casting no shadow on the diffuser elements 30, and thereby results in uniform illumination of such elements by the fluorescent tubes L. The absence of shadows results from the use of the upright T-bar supporting system 11, 15, and also from the location of the diffuser elements 30 adjacent to the upper horizontal flanges 13 of the upright T-bars.

The absence of shadows is demonstrated in FIG. 2, in which parallel rows of fluorescent tubes L are mounted on the ceiling C with the light diffuser apparatus A suspended a typical distance therebelow. As shown, the light 60 from one of the fluorescent tubes 61 will strike the upper flange 13 of a horizontal T-bar parallel thereto, but the shadow of such horizontal flange will be cast upon the side members 26 of the frame 25 of the diffuser assembly, and no portion of such shadow will be thrown upon the diffuser element 30. The same is true of the light 62 emanating from a second row of fluorescent tubes 63. Such light will strike the horizontal flange 13 of the same T-bar member 11 and it will also strike the diffuser element 30 at its edge. The shadow of the flange 13 will be thrown almost entirely upon the side member 26 of the frame and diffuser assembly. The shadow cast, of course, will not be as great as the shadow resulting from the other fluorescent lamp 61 because of the greater distance the second fluorescent lamp is removed from the flange 13.

Another row of fluorescent lamps 65 also tends to cast a shadow of the same upright T-bar, but the light 66 emanating from such fluorescent lamp will strike the T-bar and cast its shadow substantially entirely upon the side frame 26. Substantially none of the shadow will be cast upon a visible portion of the diffuser element 30. Here again, the third fluorescent lamp 65 is still further removed from the T-bar member and the shadow that it tends to cast is of lesser darkness than the fluorescent lamps previously referred to, as well as the intensity of its illumination upon the diffuser element.

The foregoing analysis of illumination and shadows is applicable to all of the frame and diffuser assemblies, the result being a complete absence of shadows visible on the diffuser element 30, and uniform lighting over the entire areas of their visible surfaces.

In addition to the foregoing advantages, the arrangement prevents leakage of light between the frame and diffuser assemblies 24 and the supporting structure 10. As shown, the upper horizontal flanges 13 overlie the upper edges 51 of the side and end members 26, 27, preventing light from passing therebetween. Any light that might leak therebetween can do nothing more than strike the web or vertical flange 12 of a T-bar member and be blocked thereby from view by the observer below the lighting system.

In addition to the absence of shadows cast upon the diffuser elements 30, and the absence of light leaks between the assemblies and the T-bar members, the latter cannot be seen inasmuch as the lower flanges 29 are directed toward each other and are closely adjacent to one another, there being a minimum of space therebetween for observation of the vertical flange portions of the T-bars, which are relatively narrow. Moreover, the close adjacency between the side and end members 26, 27 and the lower horizontal, narrow flange portions 14 of the T-bars insures the alignment of the frame and diffuser assemblies 24 with respect to one another.

The absence of shadows produced by the present light diffusing system can be compared with a typical prior system, in which the supporting structure is provided by inverted T-bars, including spaced parallel longitudinal inverted T-bars and spaced parallel cross T-bars providing openings covered by light diffuser panels. By referring to FIG. 7, which illustrates such prior system, it is to be noted that the inverted T-bars 70 include vertical webs or flanges 71 and lower horizontal flanges 72 integral therewith and extending in opposite directions therefrom. Light diffuser panels 73 rest upon the horizontal flanges 72 to cover each opening between the longitudinal inverted T-bars and cross T-bars. The T-bar system is suitably suspended from the ceiling to which the light fixtures F are secured in spaced relation, the light fixtures including fluorescent tubes L arranged in rows parallel to one another.

The system disclosed in FIG. 7 can be compared with the system disclosed in FIG. 2. The light 80 emanating from the fluorescent lamp 81 will strike the vertical flange or web 71 of an inverted T-bar extending parallel thereto and may cast a small shadow P on the marginal portion of the light diffuser panel 73. Light 82 emanating from the next fluorescent lamp 83 will strike the same vertical flange and cast the shadow of such vertical flange over a substantial width R of the light diffuser panel. The light 84 emanating from the third lamp 85 will strike the same vertical flange and cast a still longer shadow S on the light diffuser panel 73. The intensity of the shadow cast by the second lamp 83 will be less than that cast by the first lamp 81, and the intensity of the shadow cast by the third lamp 85 will be less than that cast by the second lamp, but such shadows will still be visible to the observer.

It is, accordingly, evident that applicant's light diffusing system eliminates the casting of shadows on the diffuser elements or panels 30, while at the same time concealing the supporting structure from view. It is evident from FIG. 7 that the horizontal lower flanges 72 of the T-bars are fully visible, militating against the appearance of the system as a whole. As distinguished from the FIG. 7 system, applicant's frame assemblies are visible 25, but such assemblies can be given an attractive and ornamental appearance.

I claim:

1. In a light diffuser system: a horizontal supporting frame adapted to be carried by and disposed below a ceiling structure on which a light source is mounted, said frame also being disposed below the light source, said frame comprising longitudinal members and cross-members extending between said longitudinal members and defining openings therewith, each member including a vertical flange and a horizontal flange solely at the upper end of said vertical flange; light diffusing devices for said openings, each device including a diffuser; and means mounting said devices on said members with said diffusers lying in a horizontal plane substantially above the lower half of said vertical flanges and adjacent to the horizontal plane of said horizontal flanges, said frame being of such shape and form that substantially no shadow of the horizontal supporting frame is cast on the diffuser members by the light source.

2. In a light diffuser system: a horizontal supporting frame adapted to be carried by and disposed below a ceiling structure, said frame comprising longitudinal T-bars and cross T-bars extending between said longitudinal T-bars and defining openings therewith, each T-bar including a vertical flange and oppositely directed horizontal flanges at the upper end of said vertical flange; light diffusing devices for said openings, each device including a diffuser; and means mounting said devices on said T-bars with said diffusers lying in a horizontal plane substantially above the lower half of said vertical flanges and adjacent to the horizontal plane of said horizontal flanges.

3. In a light diffuser system: a horizontal supporting frame adapted to be carried by and disposed below a ceiling structure, said frame comprising longitudinal T-bars and cross T-bars extending between said longitudinal T-bars and defining openings therewith, each T-bar including a vertical flange and oppositely directed horizontal flanges at the upper end of said vertical flange; light diffusing devices for said openings, each device including a diffuser; and means mounting said devices on said T-bars with the upper ends of said devices underlying and contiguous said horizontal flanges, with said devices extending along said vertical flanges and with said diffusers lying in a horizontal plane substantially above the lower half of said vertical flanges and adjacent to the horizontal plane of said horizontal flanges.

4. In a light diffuser system: a horizontal supporting frame adapted to be carried by and disposed below a ceiling structure on which a light source is mounted, said frame comprising longitudinal upright T-bars and defining generally rectangular openings therewith, each T-bar including a vertical flange and oppositely directed horizontal flanges at the upper end of said vertical flange; light diffusing devices for said openings, each device including a generally rectangular frame conforming substantially to a generally rectangular opening and a diffuser extending across the upper portion of said rectangular frame; and means mounting said rectangular frames on said T-bars with the upper ends of said rectangular frames underlying and adjacent to said horizontal flanges, with said rectangular frames extending along said vertical flanges and with said diffusers lying in a horizontal plane substantially above the lower half of said vertical flanges and adjacent to the horizontal plane of said horizontal flanges.

5. In a light diffuser system: a horizontal supporting frame adapted to be carried by and disposed below a ceiling structure on which a light source is mounted, said frame comprising longitudinal upright T-bars and cross upright T-bars extending between said longitudinal T-bars and defining generally rectangular openings therewith, each T-bar including a vertical flange and oppositely directed horizontal flanges at the upper end of said vertical flange; light diffusing devices for said openings, each device including a generally rectangular frame conforming substantially to a generally rectangular opening and a diffuser extending across the upper portion of said rectangular frame, each rectangular frame having a lower outwardly directed flange extending around its perimeter; and means mounting said rectangular frames on said T-bars with the upper ends of said rectangular frames underlying and adjacent to said horizontal flanges, with said rectangular frames extending along said vertical flanges, with said diffusers lying in a horizontal plane substantially above the lower half of said vertical flanges and adjacent to the horizontal plane of said horizontal flanges, and with said outwardly directed flanges underlying said vertical flanges of said T-bars.

6. In a light diffuser system: a horizontal supporting frame adapted to be carried by and disposed below a ceiling structure, said frame comprising longitudinal T-bars and cross T-bars extending between said longitudinal T-bars and defining openings therewith, each T-bar including a vertical flange and oppositely directed horizontal flanges at the upper end of said said vertical flange and oppositely directed horizontal flanges at the lower end of said vertical flange, said lower horizontal flanges having a substantially lesser width than said upper horizontal flanges; light diffuser devices for each opening, each device including a diffuser; and means mounting said devices on said T-bars with the upper ends of said devices underlying and contiguous said upper horizontal flanges, with the sides of said devices extending along said vertical flanges and across said lower horizontal flanges and contiguous said lower horizontal flanges, and with said diffusers lying in a horizontal plane substantially above the lower half of said vertical flanges and adjacent to the horizontal plane of said upper horizontal flanges.

7. In a light diffuser system: a horizontal supporting frame adapted to be carried by and below a ceiling structure on which a light source is mounted, said frame comprising longitudinal upright T-bars and cross upright T-bars extending between said longitudinal T-bars and defining generally rectangular openings therewith, each T-bar including a vertical flange and oppositely directed upper horizontal flanges at the upper end of said vertical flange and oppositely directed lower horizontal flanges at the lower end of said vertical flange, said lower horizontal flanges having a substantially lesser width than said upper horizontal flanges; light diffusing devices for said openings, each device including a generally rectangular frame conforming substantially to a generally rectangular opening and a diffuser extending across the upper portion of said rectangular frame, each rectangular frame having a lower outwardly directed flange extending around its perimeter; and means mounting said rectangular frames on said T-bars with the upper ends of said rectangular frames underlying and adjacent to said upper horizontal flanges, with said rectangular frames extending along said vertical flanges and lower horizontal flanges and contiguous said lower horizontal flanges, with said outwardly directed flanges underlying said lower horizontal flanges of said T-bars, and with said diffusers lying in a horizontal plane substantially above the lower half of said vertical flanges and adjacent to the horizontal plane of said upper horizontal flanges.

References Cited by the Examiner
UNITED STATES PATENTS

| | | | |
|---|---|---|---|
| 2,659,808 | 11/1953 | Beckwith | 240—9 |
| 2,833,199 | 5/1958 | Wakefield | 240—9 X |
| 2,913,571 | 11/1959 | Smith | 240—9 |
| 3,185,833 | 5/1965 | Blitzer | 240—9 |

NORTON ANSHER, *Primary Examiner.*